UNITED STATES PATENT OFFICE.

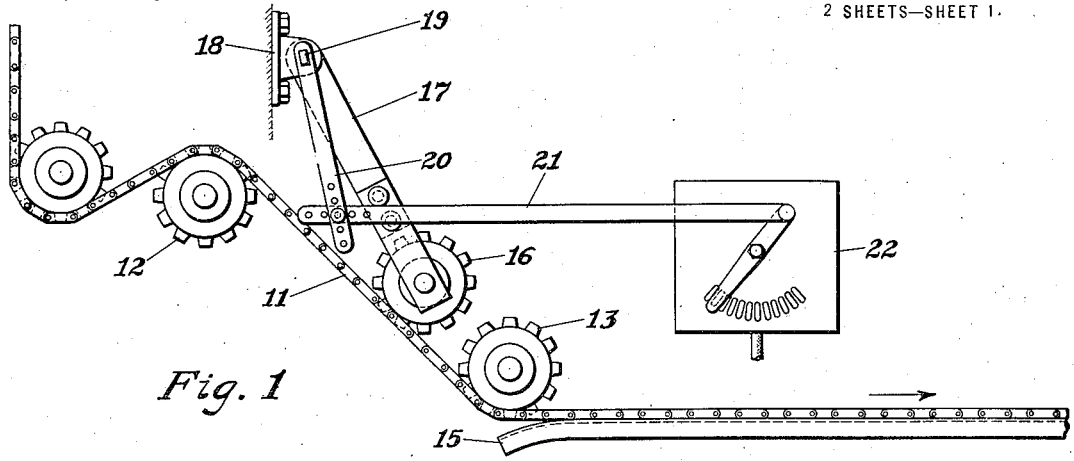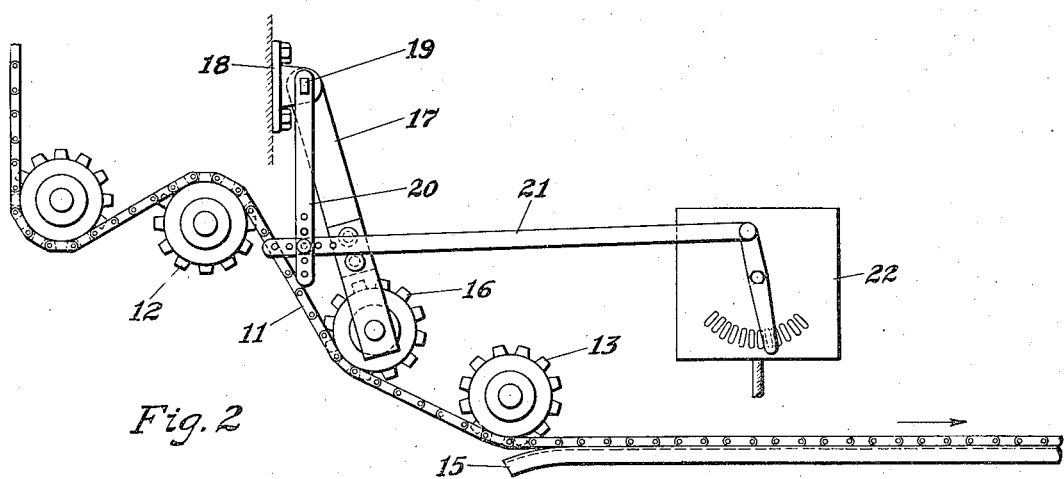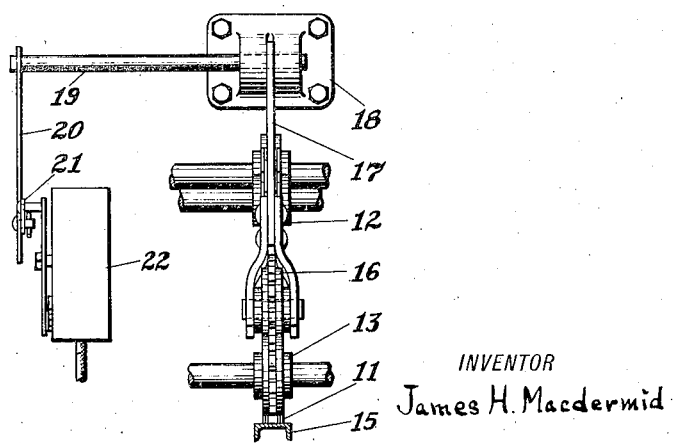

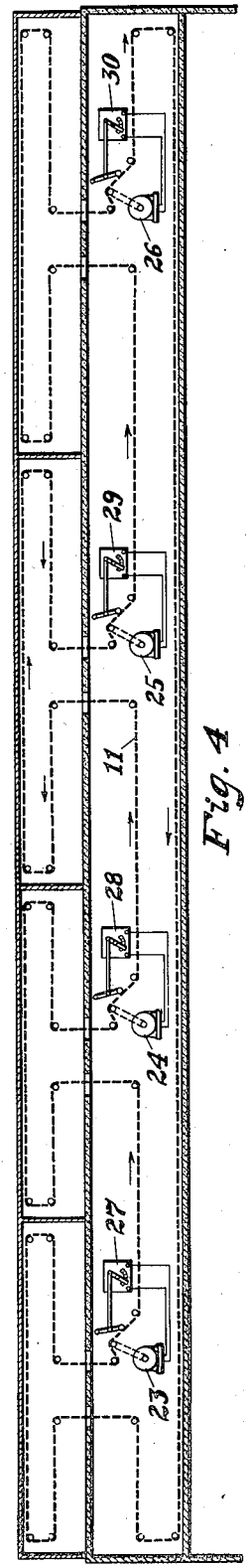

JAMES H. MACDERMID, OF DETROIT, MICHIGAN, ASSIGNOR TO DODGE BROTHERS, OF DETROIT, MICHIGAN, A CORPORATION OF MICHIGAN.

CHAIN-DRIVING MECHANISM.

1,370,029.                Specification of Letters Patent.        Patented Mar. 1, 1921.

Application filed November 3, 1917. Serial No. 200,215.

*To all whom it may concern:*

Be it known that I, JAMES H. MACDERMID, a citizen of the United States, residing at Detroit, Wayne county, Michigan, have invented certain new and useful Improvements in Chain-Driving Mechanism, of which the following is a clear, full, and exact description.

This invention relates to an improvement in chain driving mechanism with particular reference to the chains of conveyers or similar apparatus.

It has been found that where a conveyer chain is of such length and weight that it is necessary to drive it at more than one point, great difficulty is experienced in maintaining a uniform tension throughout the chain and in making each of the driving units furnish its due share of the power required. This is particularly true in cases where the chain is subjected to varying temperatures in different parts of its path so that expansion and contraction of the chain take place.

The present invention consequently aims to provide means for regulating the speed of the various motors or other sources of power used in driving a conveyer chain so that the load will be properly divided between the various motors. It further aims to provide means for regulating the speed of the units driving a conveyer chain so that the slack in the chain will not accumulate unduly at any point.

Still another purpose is to provide means for regulating the speed at which a conveyer chain is driven, in conjunction with apparatus for controlling the tension existing in the chain.

These being among the objects of the present invention the same consists of certain features of construction and combinations of parts to be hereinafter described and then claimed with reference to the accompanying drawings which illustrate a suitable embodiment of the invention having the above and other objects in view.

Figure 1 is an elevation showing the speed controlling device in conjunction with a conveyer chain which is stretched tightly.

Fig. 2 shows the same apparatus in conjunction with a slack chain.

Fig. 3 is an elevation of the apparatus, taken at right angles to those of Figs. 1 and 2.

Fig. 4 is a diagrammatic view showing four units like those shown in Figs. 1 and 2 applied to a long conveyer chain.

Referring to Fig. 1 the conveyer chain 11 is shown in engagement with the two sprockets 12 and 13 which are mounted on shafts carried in fixed bearings, the sprocket 12 being connected by suitable transmission mechanism (not shown) to an electric motor which furnishes the power for driving the chain. The sprocket 13 is used merely for guiding the chain and does not act as a driver.

Channels, such as 15, may be used to support the chain where it extends horizontally between sprockets. Engaged with the span of the chain between the sprockets 12 and 13 is the sprocket 16, carried on a swinging arm 17, which is pivoted in the bracket 18 at its upper end. It will be noted that the configuration of the mechanism is such that the tendency of the arm 17 to hang in a vertical position is resisted by the tension of the chain.

As the weight of the sprocket 16 and arm 17 is considerable, the sprocket 16 will remain in engagement with the chain even though the tension varies considerably and the chain sags down from the position shown in Fig. 1 to that shown in Fig. 2 or even beyond.

Passing through the bracket 18 and rigidly connected to the arm 17 is the shaft 19, upon the outer end of which is carried the arm 20. This arm is, in turn, connected by the link 21 to the rheostat 22 in such a way that the angular motion of the arm 20 will operate the rheostat to increase or decrease the resistance which it offers and thus control the speed of an electric motor driving sprocket 12. The exact arrangement of the connection between the sprocket 16 and the rheostat is, of course, immaterial and it is not desired to confine the invention to the particular arrangement of these and the other parts shown, but the invention is subject only to the limitations expressed in the claims. Thus, the same principle may be applied in case power is supplied in other ways than by electric motors. For example, if the chain is to be driven by line shafts which also supply power for other purposes, it will be apparent that by arranging the swinging arms to operate friction clutches between the line shafts and the driving sprockets, the same results will be obtained.

In Fig. 4 an installation of a long conveyer chain controlled at four points by the apparatus shown in Figs. 1, 2 and 3 is illustrated; 23, 24, 25 and 26, indicating the four electric motors used for driving the chain and 27, 28, 29 and 30, the four rheostats. In the installation shown, the movement of the chain is in the direction indicated by the arrows.

The operation of the device is as follows: When the chain between the sprockets 12 and 13 becomes slack due to any one of a variety of causes, as for example expansion of the chain to the right of sprocket 13, the swinging arm 17 tends to approach a vertical position and to operate the rheostat in a direction such that the speed of the driving motor which it controls is reduced. This will, consequently, allow the motor, next ahead, or (to the right, as shown in the drawings) to take up the slack which might otherwise accumulate to such an extent that the chain would get jammed or caught. In case the opposite condition occurs, and the chain becomes unduly tight as shown in Fig. 1, the sprocket 16 is swung to the right, the rheostat arm is turned in the opposite direction and the speed of the motor driving sprocket 12 is automatically increased until a desirable amount of slack is obtained.

Another arrangement which accomplishes the same result is as follows: Instead of connecting the motor 23 with the rheostat 27, as shown in Fig. 4, the rheostat 27 may be connected to the motor 24 and so connected with the swinging arm supported by the chain that an increased amount of slack tends to accelerate the motor which it controls instead of checking it. The remaining motors and rheostats, of course, would have to be interconnected in the same manner so that each of the swinging arms controls the motor next to the right or ahead in the direction in which the chain moves.

Instead of the mechanism shown, it will be apparent that any other suitable arrangement may be utilized for connecting the sprocket to the rheostat or other speed controlling device and it is not desired to confine the invention to the particular mechanism herein illustrated.

What I claim as new is:

1. The combination with an endless driven chain of such weight and length that it is necessary to drive it at a plurality of points, and a plurality of power-driven sprockets located at intervals along said chain, of means between the successive driving sprockets for so controlling the speed of operation of the corresponding sprockets of the respective couples as to provide a predetermined amount of chain slack between the sprockets of each couple, said means being independent of the reaction of the chain upon the driving sprockets.

2. The combination with an endless driven chain of such weight and length that it is necessary to drive it at a plurality of points, and a plurality of power-driven sprockets located at intervals along said chain, of means between the successive driving sprockets for so controlling the speed of operation of the first sprocket of each couple as to provide a predetermined amount of chain slack for the second sprocket of each couple.

3. The combination with an endless driven chain of such weight and length that it is necessary to drive it at a plurality of points, and a plurality of power-driven sprockets located at intervals along said chain, of means governed by the slack formed upon the delivery side of each of the successive driving sprockets for so controlling the speed of operation of said sprocket as to provide a predetermined amount of chain slack for the succeeding sprocket.

4. The combination with an endless driven chain of such weight and length that it is necessary to drive it at a plurality of points, and a plurality of power-driven sprockets located at intervals along said chain, of an idler sprocket spaced from the delivery side of each driving sprocket to provide a slack accumulating span, a follower resting upon the upper side of said span and arranged to move up and down with variations in the slack in said span, and means controlled by the position of said follower for varying the speed of the driving sprocket to maintain a predetermined amount of slack upon the delivery side of said driving sprocket.

Signed at Detroit, Mich., this 31st day of October, 1917.

JAMES H. MACDERMID.

Witnesses:
R. J. FRY,
ALFRED J. KNIGHT.